(12) United States Patent
Shimizu et al.

(10) Patent No.: US 11,804,751 B2
(45) Date of Patent: Oct. 31, 2023

(54) ELECTRIC ACTUATOR INCLUDING A HOLDER THAT HOLDS A CONDUCTIVE MEMBER AND AN ELASTIC MEMBER THAT IS INTERPOSED AND HELD BETWEEN THE HOLDER AND A CASE

(71) Applicant: NTN Corporation, Osaka (JP)

(72) Inventors: Tatsunori Shimizu, Shizuoka (JP); Kimihito Ushida, Shizuoka (JP); Masao Kurita, Shizuoka (JP)

(73) Assignee: NTN CORPORATION, Osaka (JP)

( * ) Notice: Subject to any disclaimer, the term of this patent is extended or adjusted under 35 U.S.C. 154(b) by 420 days.

(21) Appl. No.: 16/973,882

(22) PCT Filed: Jun. 25, 2019

(86) PCT No.: PCT/JP2019/025116
§ 371 (c)(1),
(2) Date: Dec. 10, 2020

(87) PCT Pub. No.: WO2020/004377
PCT Pub. Date: Jan. 2, 2020

(65) Prior Publication Data
US 2021/0265892 A1 Aug. 26, 2021

(30) Foreign Application Priority Data

Jun. 29, 2018 (JP) .................................. 2018-124582
Jun. 29, 2018 (JP) .................................. 2018-124584

(51) Int. Cl.
*H02K 5/24* (2006.01)
*H02K 5/22* (2006.01)
(Continued)

(52) U.S. Cl.
CPC ............... *H02K 5/24* (2013.01); *F16H 57/02* (2013.01); *H02K 5/225* (2013.01); *H02K 7/06* (2013.01);
(Continued)

(58) Field of Classification Search
CPC ............ H02K 5/22; H02K 5/225; H02K 5/24; H02K 7/06; F16H 25/2204;
(Continued)

(56) References Cited

U.S. PATENT DOCUMENTS 5,111,708 A * 5/1992 Brusasco ................ F16H 25/20
310/83
2009/0315417 A1 12/2009 Taguchi et al.
(Continued)

FOREIGN PATENT DOCUMENTS

AU 2005213848 A1 * 9/2005
CN 101509540 A * 8/2009
(Continued)

OTHER PUBLICATIONS

Christensen, Machine Translation of AU2005213848, Sep. 2005 (Year: 2005).*
(Continued)

*Primary Examiner* — Eric Johnson
(74) *Attorney, Agent, or Firm* — Wenderoth, Lind & Ponack, L.L.P.

(57) ABSTRACT

An electric actuator includes a case, an electric motor 5 built in the case, and a motion conversion mechanism 4 configured to convert a rotary motion of the electric motor 5 into a linear motion. The electric motor 5 is fixed to the case (gear case 10) at a first end in an axial direction of the electric motor 5, and the electric actuator is provided with a first elastic member 50 between an outer peripheral surface of the electric motor 5 and an inner peripheral surface of the (Continued)

case (motor case 60) at a second end of the electric motor opposite to the first end fixed to the case (gear case 10).

7 Claims, 10 Drawing Sheets

(51) Int. Cl.
  *H02K 7/06* (2006.01)
  *F16H 57/02* (2012.01)
  *F16H 25/22* (2006.01)
  *F16H 25/20* (2006.01)

(52) U.S. Cl.
  CPC .. *F16H 25/2204* (2013.01); *F16H 2025/2031* (2013.01); *F16H 2025/2081* (2013.01); *F16H 2057/02034* (2013.01); *F16H 2057/02082* (2013.01)

(58) Field of Classification Search
  CPC ..... F16H 2025/2031; F16H 2025/2081; F16H 2057/02034; F16H 2057/02082
  See application file for complete search history.

(56) References Cited

U.S. PATENT DOCUMENTS

| | | | | |
|---|---|---|---|---|
| 2013/0293039 | A1* | 11/2013 | Koehn | H02K 5/1732 310/51 |
| 2016/0200294 | A1* | 7/2016 | Takeo | B60T 7/00 188/156 |
| 2017/0222516 | A1* | 8/2017 | Sørensen | H02K 7/06 |
| 2020/0049236 | A1 | 2/2020 | Shimizu | |
| 2020/0052550 | A1 | 2/2020 | Shimizu | |

FOREIGN PATENT DOCUMENTS

| | | | |
|---|---|---|---|
| DE | 102008044980 A1 | * | 3/2010 |
| JP | 56-141489 | | 10/1981 |
| JP | 9-191606 | | 7/1997 |
| JP | 2003-129983 | | 5/2003 |
| JP | 2008-019732 | | 1/2008 |
| JP | 2015-59579 | | 3/2015 |
| JP | 2017-163723 | | 9/2017 |
| JP | 2017163723 A | * | 9/2017 |
| JP | 2018-071687 | | 5/2018 |
| JP | 2018-74790 | | 5/2018 |
| KR | 20130035322 A | * | 4/2013 |
| WO | WO-2018181119 A1 | * | 10/2018 |

OTHER PUBLICATIONS

Choi, Machine Translation of KR20130035322, Apr. 2013 (Year: 2009).*

Wang, Machine Translation of CN101509540, Aug. 2009 (Year: 2009).*

Shimizu, Machine Translation of WO2018181119, Oct. 2018 (Year: 2018).*

Enoshima, Machine Translation of JP2017163723, Sep. 2017 (Year: 2017).*

Heckmayr, Machine Translation of DE102008044980, Mar. 2010 (Year: 2010).*

Notice of Reasons for Refusal dated Jun. 22, 2022 in corresponding Japanese Patent Application No. 2018-124582, with English-language translation International Search Report dated Sep. 17, 2019 in International (PCT) Application No. PCT/JP2019/025116.

Notice of Reasons for Refusal dated Oct. 4, 2022 in corresponding Japanese Patent Application No. 2018-124584, with English translation International Preliminary Report on Patentability and Written Opinion of the International Searching Authority dated Dec. 29, 2020 in International (PCT) Application No. PCT/JP2019/025116.

* cited by examiner

ELECTRIC ACTUATOR INCLUDING A HOLDER THAT HOLDS A CONDUCTIVE MEMBER AND AN ELASTIC MEMBER THAT IS INTERPOSED AND HELD BETWEEN THE HOLDER AND A CASE

TECHNICAL FIELD

The present invention relates to an electric actuator.

BACKGROUND ART

In recent years, motorization has progressed in order to save labor and reduce fuel consumption of vehicles. For example, a system for operating an automatic transmission, a brake, a steering wheel, and the like of an automobile by power of an electric motor has been developed and put on the market.

As an actuator used for such an application, for example, Patent Literature 1 discloses an actuator including a ball screw mechanism that converts a rotary motion of an electric motor into a linear motion and outputs the linear motion. Further, Patent Literature 1 proposes a configuration in which a plate-shaped stay is attached to one end in an axial direction of the electric motor, and the electric motor is fastened to an actuator case with bolts via the stay to improve a position holding force of the electric motor against vibration.

CITATIONS LIST

Patent Literature 1: JP 2018-74790 A

SUMMARY OF INVENTION

Technical Problem

However, in the configuration proposed in Patent Literature 1, the electric motor is cantilever-supported, that is the electric motor is not supported at all on a side opposite to a side where the stay is provided. Thus, vibration from the outside (for example, vibration from an engine and vibration generated while the vehicle is running) which is transmitted to the electric motor may cause runout on the side where the electric motor is not supported. Therefore, the configuration proposed in Patent Literature 1 is not sufficient for application under severe vibration conditions, and needs to be improved.

An object of the present invention is to provide an electric actuator capable of highly effectively suppressing runout of an electric motor.

Solutions to Problem

In order to solve the above problems, the present invention is an electric actuator including a case, an electric motor built in the case, and a motion conversion mechanism configured to convert a rotary motion of the electric motor into a linear motion, in which the electric motor is fixed to the case at a first end in an axial direction of the electric motor, and the electric actuator is provided with a first elastic member between an outer peripheral surface of the electric motor and an inner peripheral surface of the case at a second end of the electric motor opposite to the first end fixed to the case.

In this way, the first elastic member is provided between the outer peripheral surface of the electric motor and the inner peripheral surface of the case at the second end opposite to the first end fixed to the case of the electric motor. Thus, the second end of the electric motor is elastically supported by the first elastic member. As a result, even if vibration from the outside is transmitted to the electric motor, runout at the second end of the electric motor is absorbed by the first elastic member and thereby highly effectively suppressed.

Further, the first elastic member is interposed and held while being compressed in the radial direction by the outer peripheral surface of the electric motor and the inner peripheral surface of the case, and thus a radial elastic repulsive force is generated in the first elastic member. This radial elastic repulsive force can suppress the runout in the radial direction of the electric motor (radial component of the runout). The runout suppressed by the first elastic member is not limited to the runout in the radial direction of the electric motor, but can also suppress the runout in any other direction. That is, a frictional force of the first elastic member generated between the electric motor and the case and an elastic force acting in various directions of the first elastic member can also suppress the runout in any direction intersecting the radial direction of the electric motor.

The case may have a first case split body and a second case split body configured to be assembled with each other. In this case, a protruding position restrictor is provided on an inner peripheral surface of the at least one of the first case split body or the second case split body, and the protruding position restrictor and an end surface of the case split body assembled with and other than the at least one of the first case split body or the second case split body are configured to restrict movement of the first elastic member toward both ends of the axial direction with respect to the electric motor. Thus, a position of the first elastic member can be held at the second end of the electric motor. This can prevent the first elastic member from moving in the axial direction of the electric motor and falling off due to external vibration, or the first elastic member from moving to the end (end fixed to the case) opposite to the second end of the electric motor, and therefore can reliably implement a desired function of the first elastic member (suppression of the runout at the second end of the electric motor) for a long period of time.

The first elastic member preferably includes a heat-resistant material in consideration of high temperature of the electric motor during an operation of the electric actuator.

Further, the electric actuator may include a conductive member connected to a motor terminal at the second end opposite to the first end fixed to the case of the electric motor. In this case, a second elastic member is provided between the conductive member and the case, and thus the second end of the electric motor is elastically supported by the second elastic member. As a result, even if the vibration from the outside is transmitted to the electric motor, the runout at the second end of the electric motor is absorbed by the second elastic member and thereby highly suppressed.

When the electric actuator includes a holder holding the conductive member, the second elastic member may be interposed and held between the holder and the case. In this case, the second end of the electric motor is elastically supported via the holder, and thus the runout at the second end of the electric motor is highly effectively suppressed by the second elastic member.

Further, the second elastic member may be interposed and held in the axial direction of the electric motor by the holder and the case. In this case, the second elastic member interposed in the axial direction of the electric motor causes the elastic repulsive force in the axial direction in the second elastic member. Therefore, the elastic repulsive force in the axial direction can suppress the runout in the axial direction of the electric motor (axial component of the runout). The runout suppressed by the second elastic member is not limited to the runout in the axial direction of the electric motor, but can also suppress the runout in any other direction. That is, a frictional force of the second elastic member generated between the holder and the case and an elastic force acting in various directions of the second elastic member can also suppress the runout in any direction intersecting the axial direction of the electric motor.

Further, the second elastic member may be an O-ring, the holder may be provided with a cylindrical part, and the O-ring may be attached to an outer periphery of the cylindrical part. Such a configuration facilitates attachment of the second elastic member and improves workability.

Further, when the case has the first case split body and the second case split body configured to be engaged with each other and assembled, the second elastic member may be interposed and held between the holder and the second case split body assembled with the first case split body. In this case, the second case split body is configured to be urged in a direction in which the second case split body is engaged with the first case split body due to the elastic repulsive force of the second elastic member interposed and held between the second case split body and the holder. This can eliminate a backlash at an engagement part between the case split bodies and reliably engage the case split bodies.

Advantageous Effects of Invention

The present invention can highly effectively suppress vibration of the electric motor, and is less likely to cause problems such as damage to parts due to the runout of the electric motor. The present invention can therefore provide the highly reliable electric actuator applicable even in a severe vibration environment.

DESCRIPTION OF EMBODIMENTS

Figure 1:
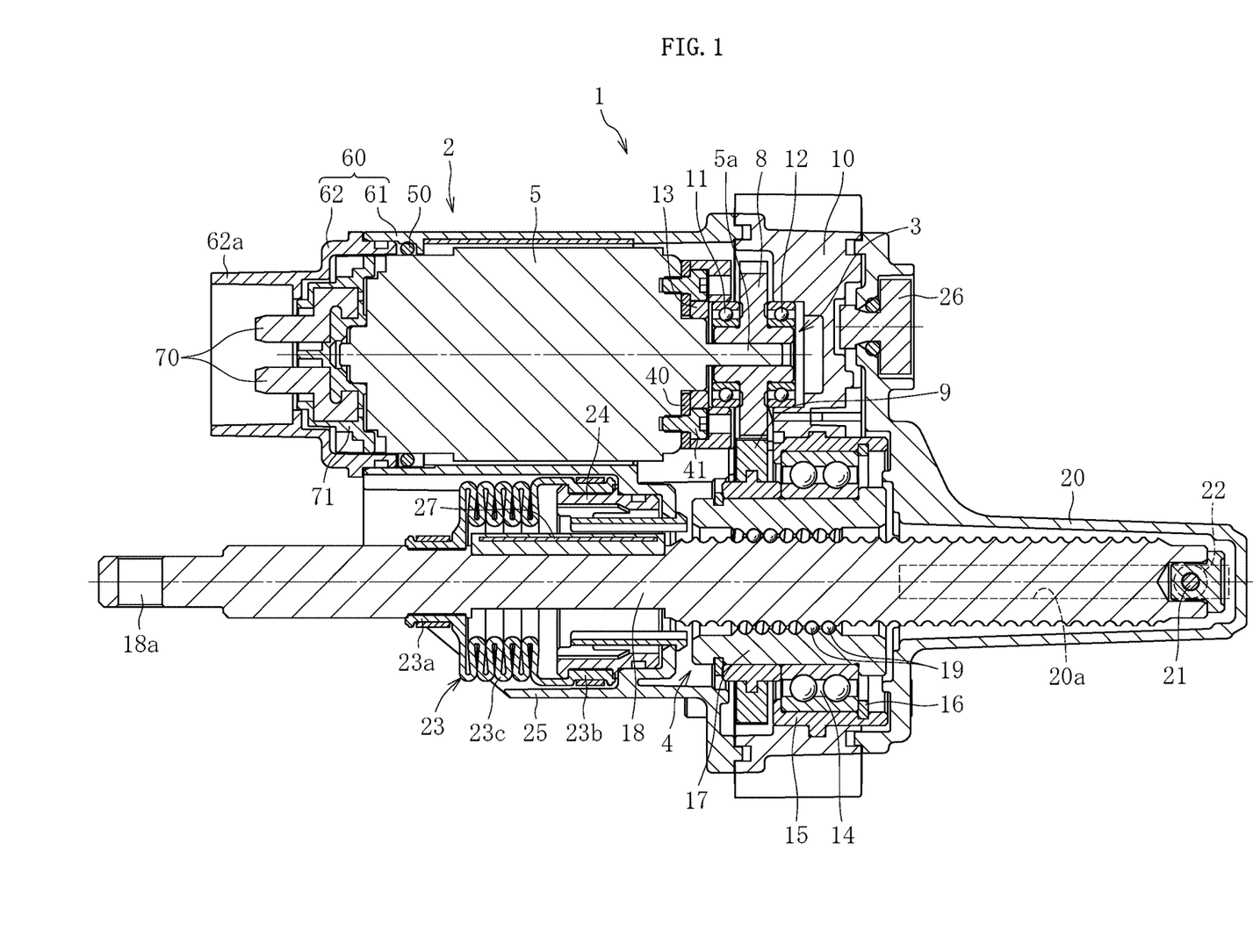
FIG. 1 is a sectional view of an electric actuator according to an embodiment of the present invention.

FIG. 1 is a sectional view of an electric actuator according to an embodiment of the present invention. First, an overall configuration and operation of the electric actuator according to the present embodiment will be described with reference to FIG. 1.

The electric actuator 1 shown in FIG. 1 mainly includes a motor section 2 having an electric motor 5, a driving force transmission mechanism 3 that transmits a rotary motion of the electric motor 5, and a motion conversion mechanism 4 that converts the rotary motion of the electric motor 5 into a linear motion.

The motor section 2 includes an electric motor 5, a pair of bus bars 70 as conductive members supplying electric power to the electric motor 5, and a motor case 60 accommodating the electric motor 5, the bus bars 70, and the like. In the present embodiment, an inexpensive DC motor (with a brush) is used as the electric motor 5, but another motor such as a brushless motor may be used. The motor case 60 referred to here is configured as a separate body from a case (housing) of the electric motor 5 itself, and is a case of the electric actuator (actuator case) which accommodates the entire electric motor 5 having its own case.

The motor case 60 has a cylindrical body 61 as a first case split body that accommodates most part of the electric motor 5, and a lid-shaped cap 62 as a second case split body fixed to one end (left end in FIG. 1) of the body 61. Each bus bar 70 is formed by bending a metal plate member into a predetermined shape, and is held by a resin holder 71. Further, each bus bar 70 is connected to motor terminals 5d (see FIG. 2) of the electric motor 5 by welding with the holder 71 fixed to an end (left end in FIG. 1) of the electric motor 5. The cap 62 is provided with a cylindrical connector 62a that protrudes in an axial direction, and a tip (end on a side opposite to a side connected to the motor terminals 5d) of each bus bar 70 is disposed on an inner periphery of the connector 62a. A terminal at the other end of the power line extending from a power source (not shown) is connected to the tip of each bus bar 70, and the power source can supply electric power to the electric motor 5.

The driving force transmission mechanism 3 includes a drive gear 8 on a drive side and a driven gear 9 on a driven side that meshes with the drive gear 8. The drive gear 8 and the driven gear 9 are accommodated in a gear case 10. The drive gear 8 is a small-diameter gear having fewer teeth than the driven gear 9, and is attached so as to rotate integrally with a rotary shaft 5a of the electric motor 5. On the other hand, the driven gear 9 is a large-diameter gear having more teeth than the drive gear 8, and is attached so as to rotate integrally with a nut 17 described later that configures the motion conversion mechanism 4.

Further, the drive gear 8 is rotatably supported by two bearings 11 and 12 at both ends of the drive gear 8 in the axial direction. Of the two bearings 11 and 12, one bearing 11 (on the left in FIG. 1) is held by being fitted into a cylindrical bearing holding member 13 fixed to the end of the electric motor 5, and the other bearing 12 (on the right in FIG. 1) is held by being fitted into the gear case 10. The driven gear 9 is rotatably supported together with the nut 17 by a double-row bearing 14 provided on an outer peripheral surface of the nut 17. The double-row bearing 14 is accommodated in a cylindrical sleeve 15 provided in the gear case 10, and an axial movement of the double-row bearing 14 is restricted by a retaining ring 16 attached to the inner peripheral surface of the sleeve 15. As the double-row bearing 14, a double-row angular contact ball bearing capable of supporting an axial load in both directions in addition to a radial load is preferably used so as to be able to support the nut 17 stably and reliably.

When the electric motor 5 starts driving and the rotary shaft 5a of the electric motor 5 rotates, the drive gear 8 rotates integrally with the rotary shaft 5a, and the driven gear 9 rotates in conjunction with this rotation. At this time, the rotary motion from the electric motor 5 is transmitted from the drive gear 8 having fewer teeth to the driven gear 9 having more teeth, which reduces speed and increases a rotational torque. In this way, by increasing the rotational torque by decelerating between the drive gear 8 and the driven gear 9 and outputting the rotational torque, a sufficient output can be obtained by using a small electric motor. Note that, unlike the present embodiment, the drive gear 8 and the driven gear 9 may be configured with gears having the same number of teeth, and the rotary motion from the electric motor 5 may be transmitted without deceleration.

The motion conversion mechanism 4 is a ball screw mechanism including the nut 17 as a rotating member, a screw shaft 18 as a linear motion member, and multiple balls 19. Spiral grooves are formed on an inner peripheral surface of the nut 17 and an outer peripheral surface of the screw shaft 18, and the balls 19 are rollably accommodated between the spiral grooves. Further, the nut 17 is provided with a circulation member (not shown), and the balls 19 are configured to circulate along the spiral grooves by the circulation member.

The screw shaft 18 is inserted through an inner periphery of the nut 17 and is disposed parallel to the rotary shaft 5a of the electric motor 5. A connection hole 18a is provided at a front end (left end in FIG. 1) of the screw shaft 18, and by inserting a fastener such as a bolt into the connection hole 18a, the screw shaft 18 and a corresponding part of an apparatus as an operation target (not shown) are connected to each other. When the rotary motion of the electric motor 5 is transmitted to the nut 17 via the drive gear 8 and the driven gear 9, the nut 17 rotates to move the screw shaft 18 in one axial direction (forward or backward). On the contrary, when the electric motor 5 rotates in a reverse direction, the rotary motion is transmitted to the nut 17 via the drive gear 8 and the driven gear 9 to move the screw shaft 18 to the other axial direction. In this way, the forward or reverse rotation of the electric motor 5 causes the screw shaft 18 to move forward or backward, and thus the operation target connected to the front end of the screw shaft 18 is operated.

A rear end of the screw shaft 18 (end opposite to the end where the operation target is connected) is covered with a screw shaft case 20. The screw shaft case 20 is fixed to the gear case 10 on a side opposite to a side where the motor case 60 is fixed.

Further, at the rear end of the screw shaft 18, a detent pin 21 is provided as a rotation restricting member that restricts a rotation of the screw shaft 18. The detent pin 21 is attached to the screw shaft 18 in a direction orthogonal to or intersecting the axial direction of the screw shaft 18. Guide rollers 22 are rotatably attached to both ends of the detent pin 21 protruding from the rear end of the screw shaft 18 in an outer diameter direction. The guide rollers 22 are inserted into a pair of guide grooves 20a provided in the screw shaft case 20 and extending in the axial direction. In response to the axial movement of the guide roller 22 along the guide groove 20a, the screw shaft 18 moves forward or backward in the axial direction without rotating in the peripheral direction.

Further, the screw shaft 18 is provided with a boot 23 preventing foreign matter from entering the electric actuator 1 and a boot cover 25 protecting the boot 23 closer to the front end of the nut 17. The boot 23 includes a small-diameter end 23a, a large-diameter end 23b, and bellows 23c connecting the small-diameter end 23a and the large-diameter end 23b and expanding and contracting in the axial direction. The small-diameter end 23a is fixed to the outer peripheral surface of the screw shaft 18, and the large-diameter end 23b is fixed to an outer peripheral surface of a cylindrical boot attachment member 24 attached to the boot cover 25. The boot cover 25 is disposed to cover the outside of the boot 23, and is integrally molded with the body 61 of the motor case 60.

In response to the expansion or contraction of the boot 23 due to a reciprocating motion of the screw shaft 18, a pressure inside the boot 23 fluctuates. Thus, the bellows 23c may be excessively deformed due to the internal pressure fluctuation especially when an amount of axial movement of the screw shaft 18 is large, and then durability of the bellows 23c may decrease. In order to prevent damage to the bellows 23c due to the fluctuations in the internal pressure of the boot 23, a ventilation filter 26 is provided in the screw shaft case 20. The ventilation filter 26 communicates with an internal space of the boot 23 through the electric actuator 1. When the boot 23 expands and contracts, air flows in or out through the ventilation filter 26 to suppress the deformation of the bellows 23c.

Further, on the outer peripheral surface of the screw shaft 18, a magnet 27 serving as a sensor target detecting an axial position of the screw shaft 18 is provided. Meanwhile, a stroke sensor (not shown) is provided on an outer periphery of the motor case 60. When the screw shaft 18 moves forward or backward, the stroke sensor detects a change in a magnetic field (for example, a direction and strength of a magnetic flux density) of the magnet 27 that moves in accordance with the movement of the screw shaft 18. Thus, an axial position of the magnet 27 and the axial position of the screw shaft 18 are detected.

Here, a support structure of the electric motor 5 in the electric actuator 1 according to the present embodiment will be described with reference to FIGS. 2 and 3.

Figure 2:
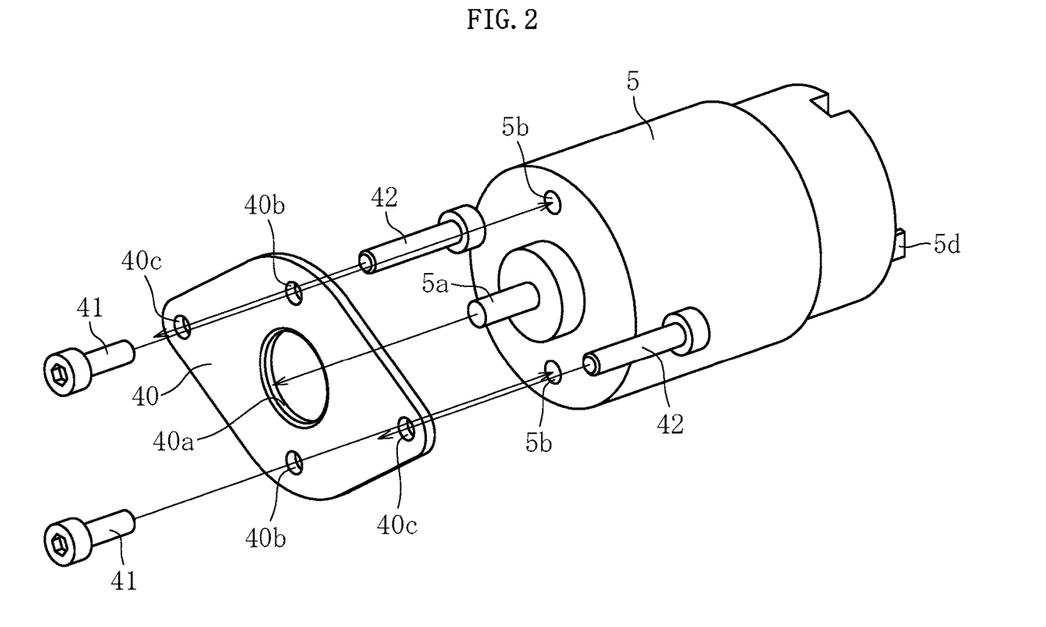
FIG. 2 is a perspective view of a stay and bolts supporting an electric motor.
Figure 3:
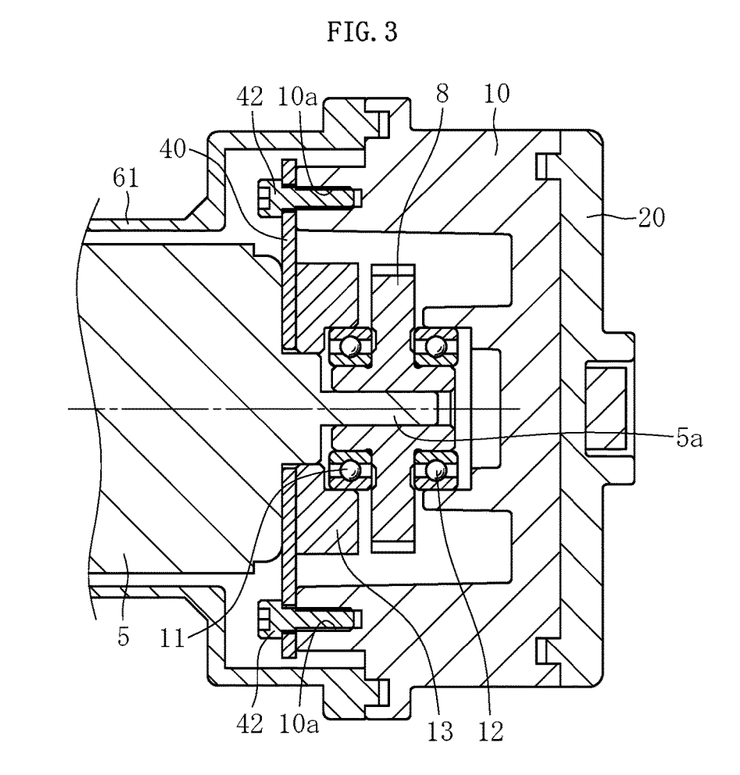
FIG. 3 is a sectional view showing a part where the stay is fixed to a gear case.

As shown in FIG. 2, a plate-shaped stay 40 as a support member is fixed, by two bolts 41, to an end surface from which the rotary shaft 5a of the electric motor 5 protrudes. Specifically, a hole 40a is provided in a center of the stay 40. Two bolts 41 are screwed into screw holes 5b provided in the end surface of the electric motor 5 through bolt insertion holes 40b provided in the stay 40 with the rotary shaft 5a of the electric motor 5 inserted through the hole 40a. Thus, the stay 40 is fixed to the end surface of the electric motor 5. Further, the stay 40 is provided with bolt insertion holes 40c for inserting two other bolts 42. The bolts 42 are inserted through these bolt insertion holes 40c, and the bolt 42 are screwed into screw holes 10a provided in the gear case 10 as shown in FIG. 3. Thus, the stay 40 is fixed to the gear case 10. Thus, the electric motor 5 is fixed to the gear case 10 via the stay 40.

As described above, in the electric actuator 1 according to the present embodiment, the electric motor 5 is fixed to the gear case 10 via the stay 40 at a first end in the axial direction of the electric motor 5. Meanwhile, a second end of the electric motor 5 in the axial direction is not fastened to the motor case 60 with bolts or the like. If the electric motor 5 is not supported at the second end (hereinafter referred to as "non-fixed end") at all, the electric motor 5 is cantilever-supported. Thus, there is a problem in applying the electric actuator in a vibration environment of being exposed to vibration from the outside (for example, vibration from an engine and vibration generated while a vehicle is running). Specifically, when the vibration from the outside is transmitted to the electric motor 5, runout of the electric motor 5 tends to increase particularly at a location away from a fixed end of the electric motor 5 (non-fixed end). In a configuration in which the motor terminals 5d and the bus bars 70 are connected at the non-fixed end of the electric motor 5 as in the present embodiment, a welded part between the motor terminals 5d and the bus bars 70 may be damaged due to an influence of the runout, and a connection state may not be favorably maintained. For example, when the runout occurs at the non-fixed end of the electric motor 5, and the holder 71 fixed to the electric motor 5 collides with an inner surface of the motor case 60 before the electric motor 5 does, a reaction force (force in a direction opposite to a direction of the vibration) due to the collision restricts the movement (runout) of the holder 71. Inertial movement due to the runout moves the non-fixed end of the electric motor 5 further toward the inner surface of the motor case 60. This generates movement in opposite directions between the holder 71 and the electric motor 5. In such a case, the movement of the holder 71 and the electric motor 5 in opposite directions applies a load in directions of separating the motor terminals 5d and the bus bars 70 from each other at a welded part. Repeatedly under the load, the welded part is damaged due to fatigue or the like, resulting in a failure (uncontrollable state) of the electric actuator 1.

In the present embodiment, the following measures are taken in order to suppress the vibration highly effectively at the non-fixed end of the electric motor 5.

Figure 4:
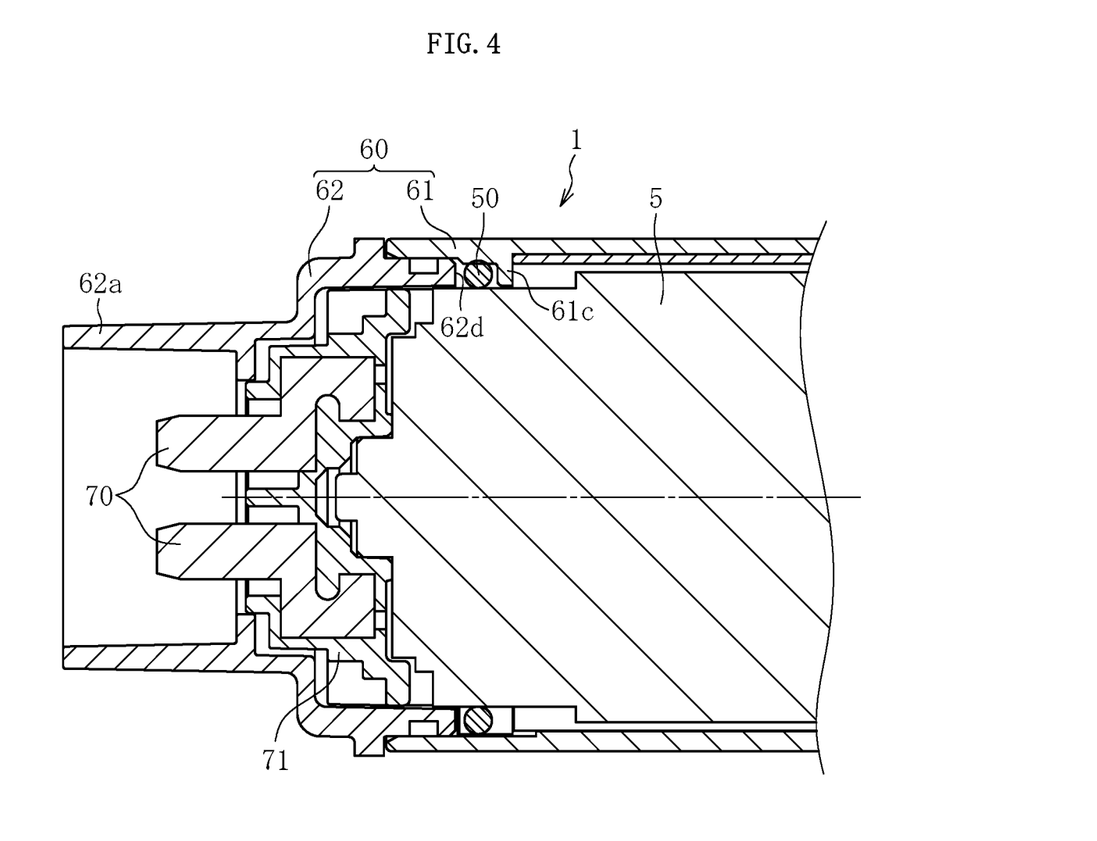
FIG. 4 is a sectional view showing a non-fixed end of the electric motor and its periphery.

FIG. 4 is a sectional view showing the non-fixed end of the electric motor and its periphery.

As shown in FIG. 4, in order to suppress the runout of the electric motor 5 at the non-fixed end, the electric actuator 1 according to the present embodiment is provided with an O-ring 50 as an elastic member between an outer peripheral surface of the electric motor 5 at the non-fixed end side and an inner peripheral surface of the body 61 of the motor case 60. The O-ring 50 is held interposed between the electric motor 5 and the body 61 of the motor case 60 in a radial direction. Further, movement of the O-ring 50 in the axial direction of the electric motor 5 is restricted by a protruding position restrictor 61c provided on the inner peripheral surface of the body 61 and an end surface 62d of the cap 62 fitted on an inner periphery of the body 61.

Figure 5:
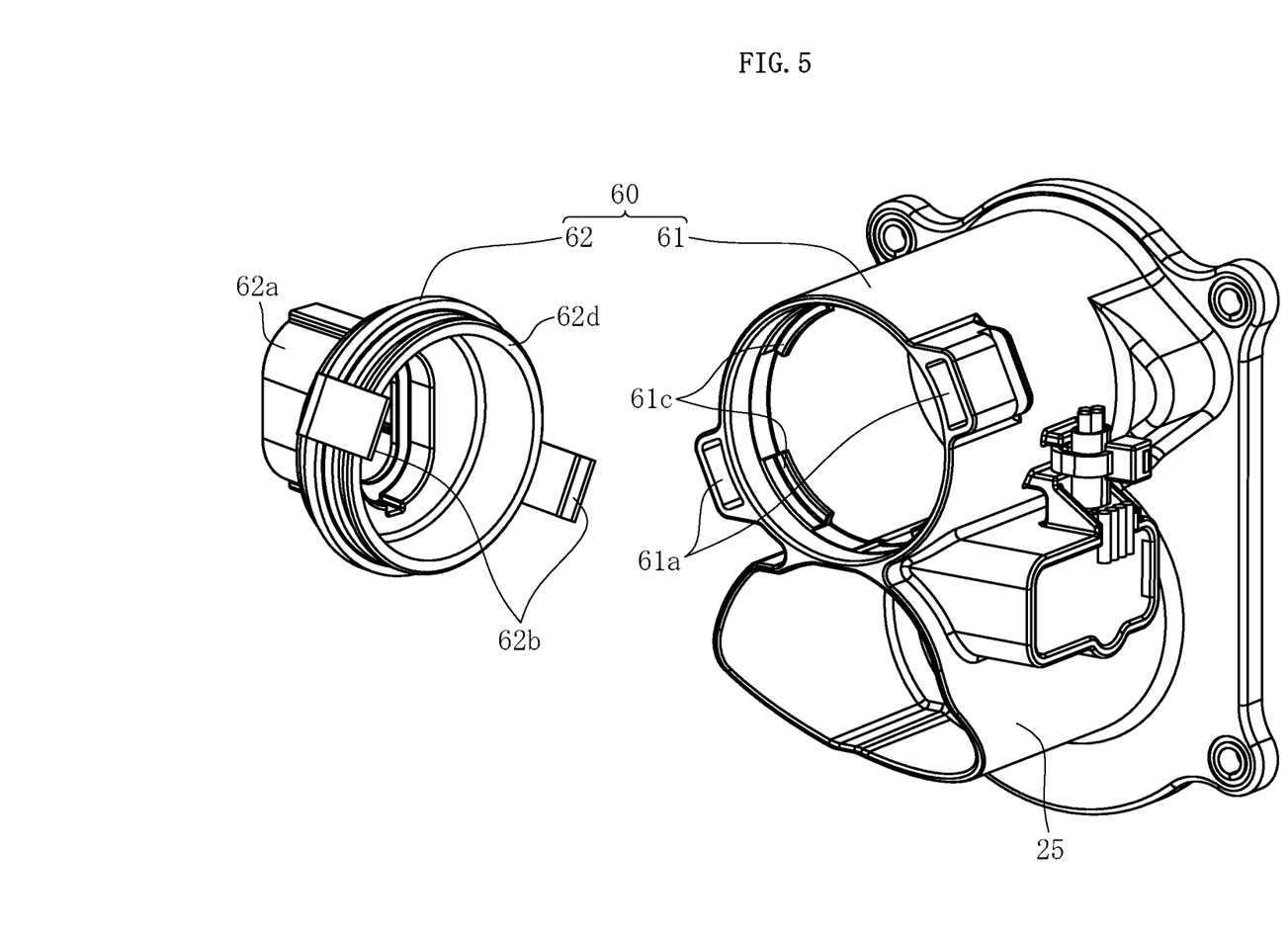
FIG. 5 is a perspective view of a body and a cap of a motor case.

As shown in FIG. 5, a plurality of the protruding position restrictors 61c extending in the peripheral direction is provided on the inner peripheral surface of the body 61. In the present embodiment, the position restrictors 61c are provided intermittently in the peripheral direction. However, the position restrictors may be annular position restrictors 61c provided continuously in the peripheral direction.

Further, as shown in FIG. 5, the cap 62 is provided with a pair of engaging parts 62b formed in a claw shape at positions symmetrical with each other by 180°. Meanwhile, the body 61 is provided with a pair of introduction parts 61a into which the engaging parts 62b are introduced.

Figure 6:
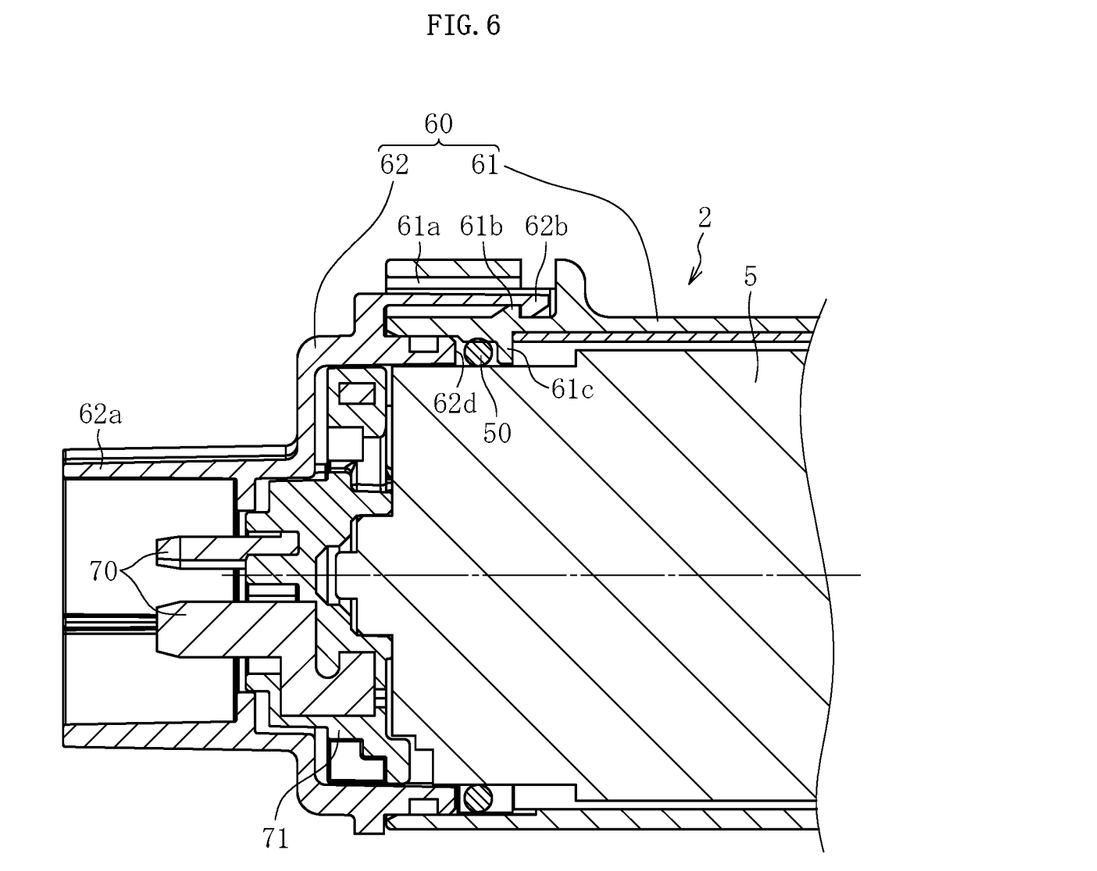
FIG. 6 is a sectional view showing an engaging part and an engaged part.

As shown in FIG. 6, engaged parts 61b that can be engaged with the engaging parts 62b are provided in the introduction parts 61a. An engagement structure between the engaging parts 62 and the engaged parts 61b is a so-called snap-fit engagement structure. The engaging parts 62b, which are introduced into the introduction parts 61a along the axial direction of the electric motor 5, bend and elastically deform in a direction away from each other. When the engaging parts 62b reach the engaged parts 61b, the engaging parts 62b are elastically restored, and are engaged or engageable with the engaged parts 61b, causing the cap 62 to be assembled with the body 61.

The end surface 62d of the cap 62 assembled in this way faces the O-ring 50 attached within the body 61, and thus the O-Ring 50 is held between the end surface 62d of the cap 62 and the position restrictors 61c. In this state, the end surface 62d of the cap 62 and the position restrictors 61c may be in contact or in non-contact with the O-ring 50. Thus, the movement of the O-ring 50 in the axial direction of the electric motor 5 is restricted by the end surface 62d of the cap 62 and the position restrictors 61c.

As described above, in the electric actuator 1 according to the present embodiment, the O-ring 50 as an elastic member is provided between the outer peripheral surface of the electric motor 5 at the non-fixed end side and the inner peripheral surface of the body 61 of the motor case 60. Thus, the non-fixed end of the electric motor 5 is elastically supported by the O-ring 50. That is, in the present embodiment, the non-fixed end of the electric motor 5, the holder 71 fixed to the non-fixed end, and the bus bars 70 held by the holder 71 are disposed on the inner surface of the motor case 60 with a gap therebetween and are not fixed to the motor case 60, but are elastically supported by the non-fixed end of the electric motor 5 being in contact with the motor case 60 via the O-ring 50. Thus, even if the runout occurs at the non-fixed end of the electric motor 5, the runout is absorbed by the O-ring 50 and is suppressed, thereby preventing the holder 71 from colliding with the inner surface of the motor case 60. Alternatively, even if the holder 71 collides with the inner surface of the motor case 60, an impact of the collision can be suppressed. This can reduce the load at the welded part between the motor terminals 5d and the bus bars 70 due to the collision, and avoid damage to the welded part.

Here, in the present embodiment, the O-ring 50 is compressed in the radial direction of the electric motor 5 and held, and thus a radial elastic repulsive force of the O-ring 50 can suppress the runout of the electric motor 5 in the radial direction (radial component of the runout). The runout suppressed by the O-ring 50 is not limited to the runout in the radial direction of the electric motor 5, but can also suppress the runout in any other direction. That is, a frictional force of the O-ring 50 generated between the electric motor 5 and the motor case 60 and an elastic force acting in various directions of the O-ring 50 can suppress the runout in any direction intersecting the radial direction of the electric motor 5.

As described above, in the present embodiment, the runout at the non-fixed end side of the electric motor 5 can be highly effectively suppressed. Thus, the motor terminals 5d and the bus bars 70 can be favorably kept connected even in a severe vibration environment, and a highly reliable electric actuator can be provided.

Further, as in the present embodiment, the movement of the O-ring 50 in the axial direction is restricted by the end surface 62d of the cap 62 and the position restrictors 61c of the body 61, and thus a position of the O-ring 50 can be held at the non-fixed end of the electric motor 5. This can prevent the O-ring 50 from moving in the axial direction of the electric motor 5 and falling off due to external vibration, or the O-ring 50 from moving to the fixed end of the electric motor 5, and therefore can reliably implement a desired function of the O-ring 50 (suppression of the runout at the non-fixed end of the electric motor 5) for a long period of time. Further, contrary to the present embodiment, a configuration is possible in which the protruding position restrictors are provided on the inner peripheral surface of the cap 62, and the axial movement of the O-ring 50 is restricted by the position restrictors and the end surface of the body 61.

Further, because the electric motor 5 may become hot during an operation of the electric actuator 1, the O-ring 50 desirably includes a heat-resistant material {for example, fluororubber (FKM) or the like}. Instead of the O-ring, other elastic members capable of suppressing the runout of the electric motor may be used.

Subsequently, with reference to FIGS. 7 to 12, other embodiments of the present invention will be described mainly with respect to parts different from the above embodiment and parts not described in the above embodiment. Further, in FIGS. 7 to 12, the members and parts having the same configuration as that of the above embodiment are designated by the same reference signs as those in FIGS. 1 to 6, and some of the description thereof will be omitted.

Figure 7:
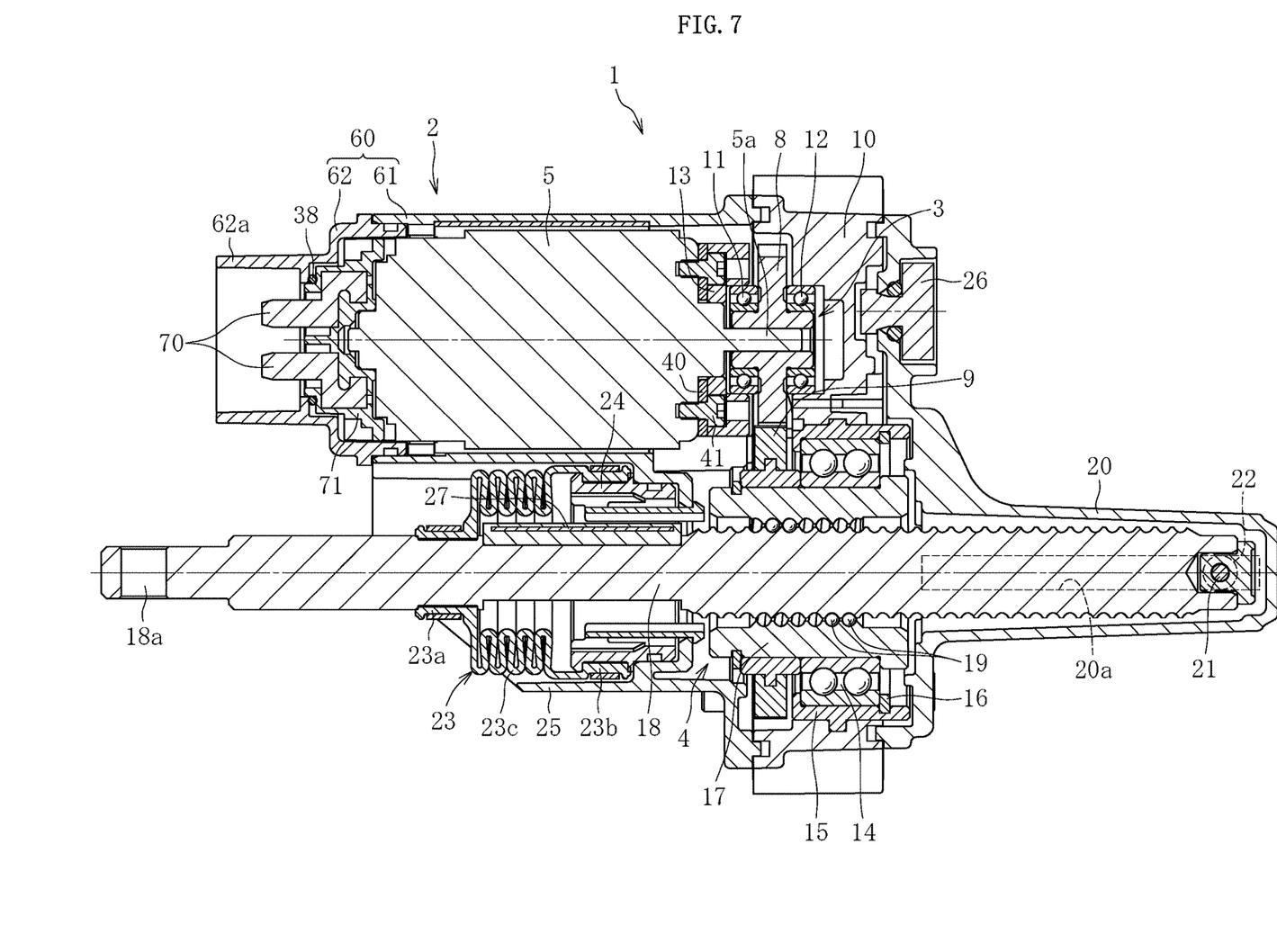
FIG. 7 is a sectional view of an electric actuator according to another embodiment of the present invention.
Figure 8:
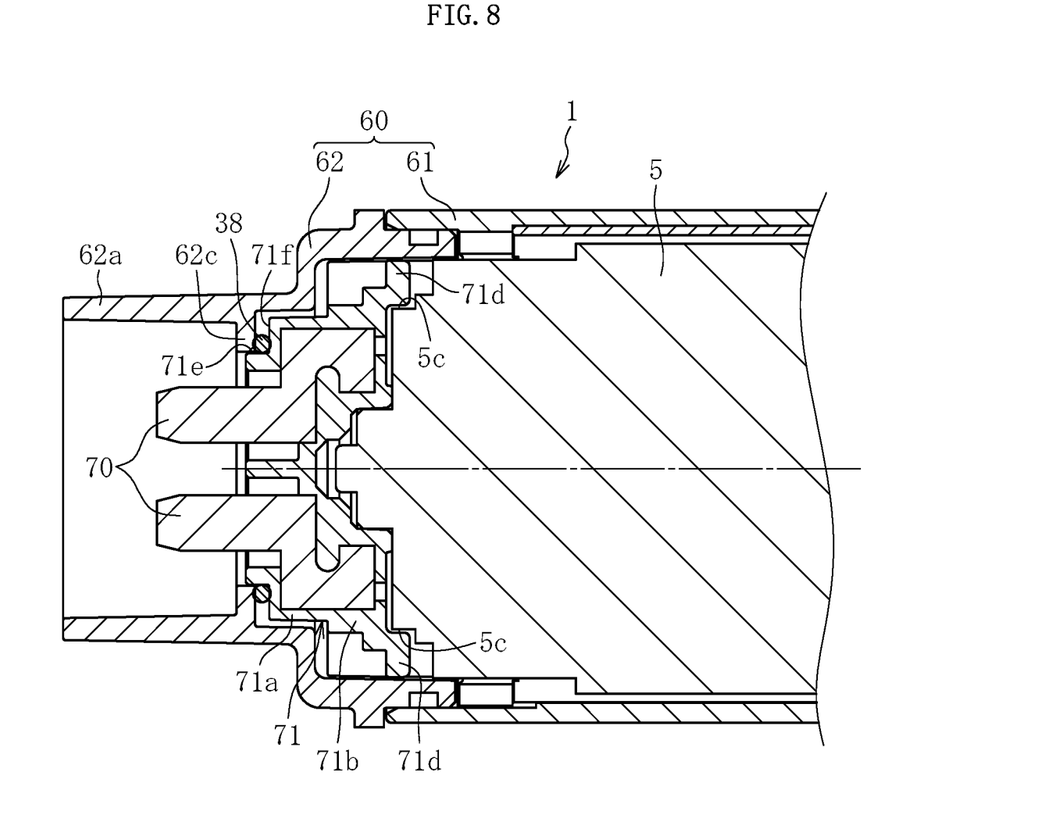
FIG. 8 is a sectional view showing a non-fixed end of the electric motor and its periphery.

As shown in FIGS. 7 and 8, in order to suppress the runout at the non-fixed end (end not fastened to the motor case 60) of the electric motor 5, a rubber O-ring 38 as a second elastic member different from the O-ring 50 is provided between the bus bars 70 and the motor case 60 in the electric actuator 1 according to the present embodiment. The O-ring 38 is held interposed between the holder 71 holding the bus bars 70 and the cap 62 of the motor case 60 in the axial direction of the electric motor 5. In the present embodiment, the O-ring 50 as the first elastic member is provided between the outer peripheral surface of the electric motor 5 at the non-fixed end side and the inner peripheral surface of the motor case 60, as in the above embodiment. The O-ring 50 is, however, not shown in FIGS. 7, 8, and 12.

Here, configurations of the holder 71 and the cap 62 interposing and holding the O-ring 38 will be described in detail.

Figure 9:
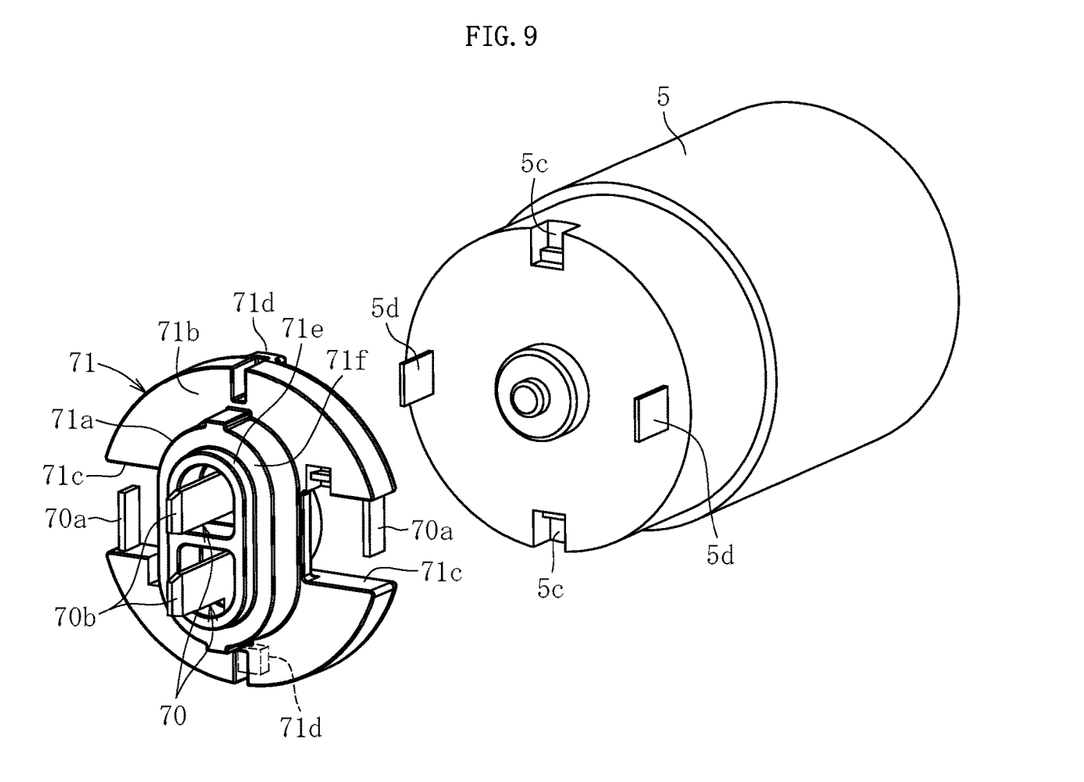
FIG. 9 is a perspective view of the electric motor, bus bars, and a holder.
Figure 10:
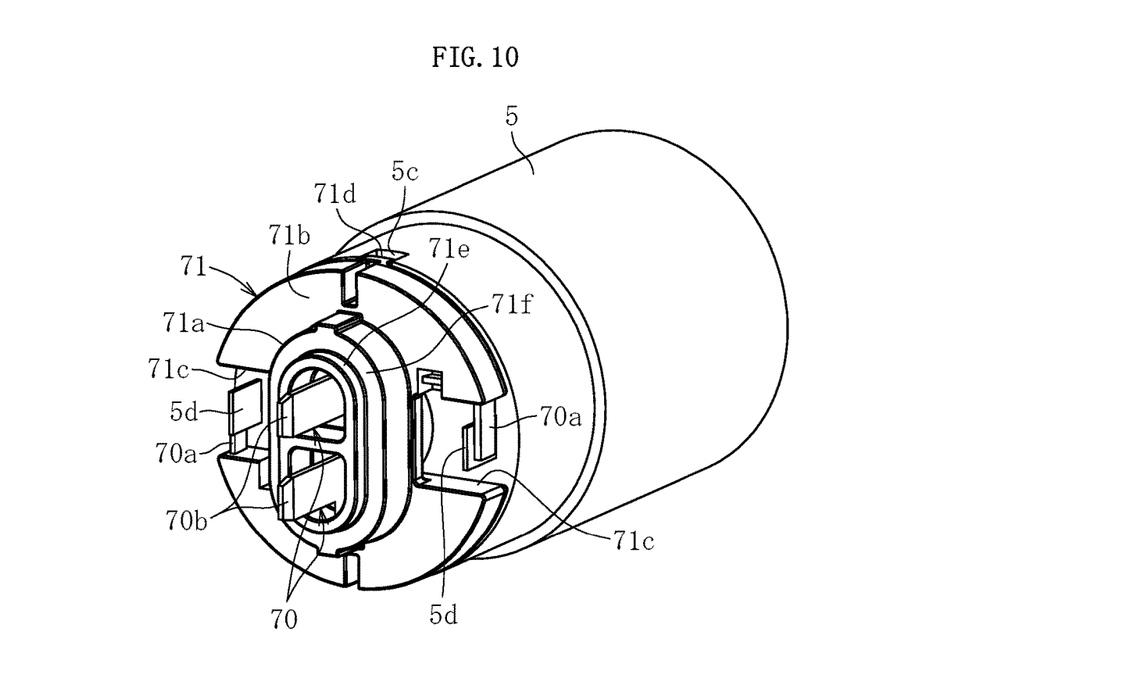
FIG. 10 is a perspective view showing a state in which the holder is fixed to the electric motor.

As shown in FIG. 9, the holder 71 has a cylindrical part 71a and a flange 71b that protrudes outward from the outer peripheral surface of the cylindrical part 71a. Further, the holder 71 is integrated with the bus bars 70 by insert molding. Rectangular recesses 71c are formed in the flange 71b at a position symmetrical with each other by 180°. First ends 70a of the respective bus bars 70 are disposed in the recesses 71c so as to be exposed. Meanwhile, a second end 70b of each bus bar 70 is disposed so as to protrude in the axial direction from a space of the cylindrical part 71a partitioned into two. Further, the flange 71b is provided with a pair of protruding fitting parts 71d at locations 90° out of phase with the recesses 71c. At the non-fixed end of the electric motor 5, recessed fitting parts 5c that can be fitted with the protruding fitting parts 71d of the flange 71b are provided. As shown in FIG. 10, the protruding fitting parts 71d of the holder 71 are axially fitted to the recessed fitting parts 5c of the electric motor 5, and thus the holder 71 is fixed to the non-fixed end of the electric motor 5. Then, in this state, the first ends 70a of the respective bus bars 70 are welded to the motor terminals 5d and electrically connected.

Further, as shown in FIG. 9, on the outer peripheral surface of a tip end side of the cylindrical part 71a, a step is formed including an attachment surface 71e disposed along the axial direction of the cylindrical part 71a and attaching the O-ring 38 in the axial direction, and an abutting surface 71f to which the O-ring 38 is abutted and that is disposed in a direction intersecting the axial direction of the cylindrical part 71a. As shown in FIG. 8, the O-ring 38 is attached to the outer periphery of the attachment surface 71e, and is abutted against the abutting surface 71f to be positioned in the axial direction.

Figure 11:
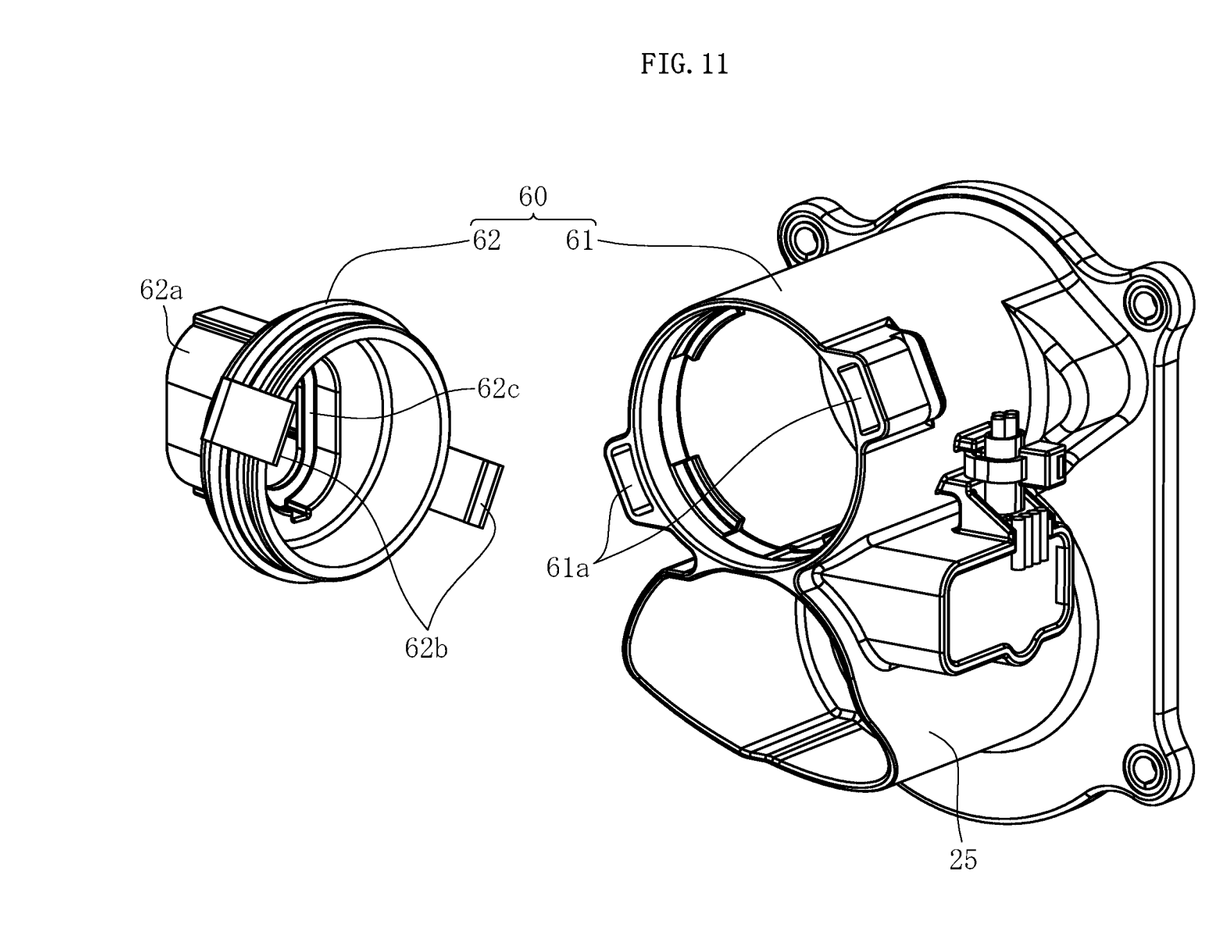
FIG. 11 is a perspective view of a body and a cap of the motor case.

As shown in FIG. 11, the cap 62 is provided with the pair of engaging parts 62b formed in a claw shape at the positions symmetrical with each other by 180° in the present embodiment. Meanwhile, the body 61 is provided with a pair of introduction parts 61a into which the engaging parts 62b are introduced.

Figure 12:
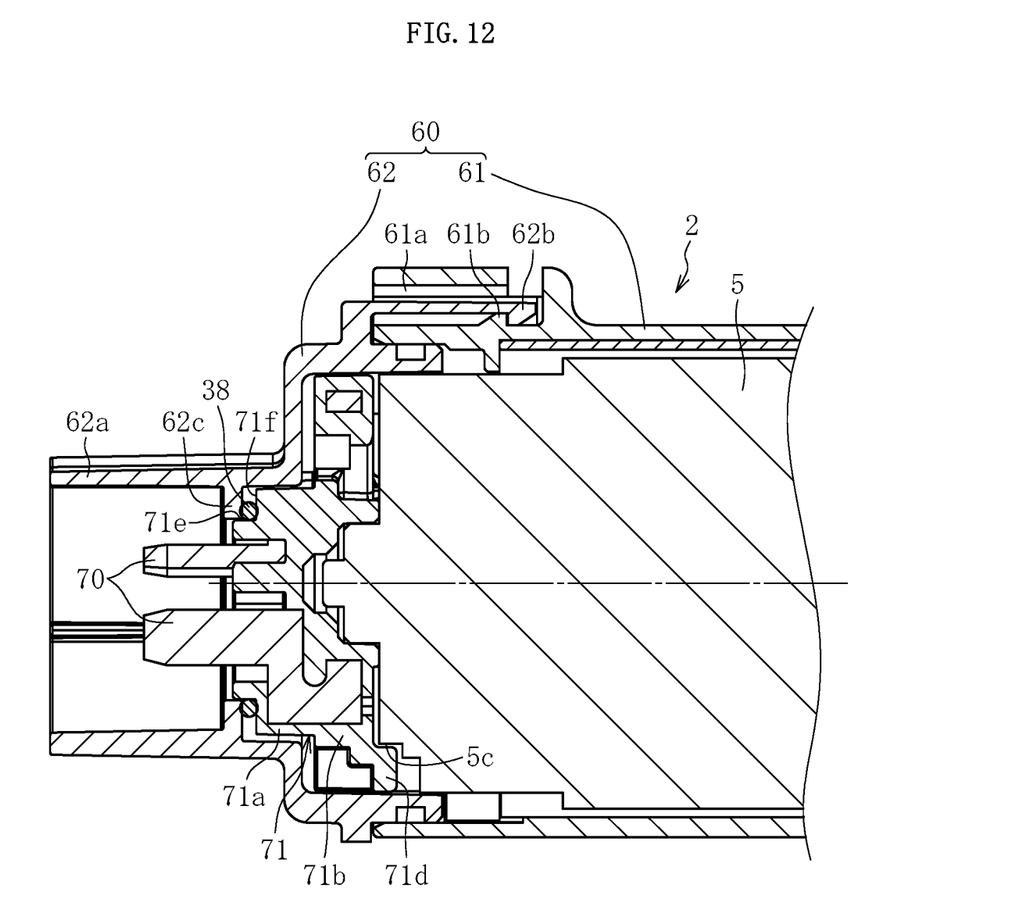
FIG. 12 is a sectional view showing an engaging part and an engaged part.

As shown in FIG. 12, the engaging parts 62b and the engaged parts 61b as a snap-fit engagement structure are provided in the introduction parts 61a as in the above embodiment. Further, as shown in FIGS. 11 and 12, an annular protruding wall 62c continuous in the peripheral direction is provided on the inner peripheral surface of the connector 62a included in the cap 62.

As shown in FIG. 12, the annular protruding wall 62c interposes and holds the O-ring 38 together with the abutting surface 71f provided on the holder 71 while the cap 62 is attached to the body 61. That is, the O-ring 38 is attached to the attachment surface 71e of the holder 71, and the holder 71 is fixed to the electric motor 5. Further, the cap 62 is attached to the body 61 while the electric motor 5 is accommodated in the body 61. Then, the O-ring 38 is pushed in the axial direction of the electric motor 5 by the protruding wall 62c of the cap 62, and the O-ring 38 is pressed against the abutting surface 71f of the holder 71. As a result, the O-ring 38 is interposed and held between the protruding wall 62c and the abutting surface 71f while compressed in the axial direction of the electric motor 5.

As described above, in the electric actuator 1 according to the present embodiment, the O-ring 38 as the second elastic member is provided between the abutting surface 71f of the holder 71 and the protruding wall 62c of the cap 62. Thus, the non-fixed end of the electric motor 5 is elastically supported by the O-ring 38. That is, in the present embodiment, the non-fixed end of the electric motor 5, the holder 71 fixed to the non-fixed end, and the bus bars 70 held by the holder 71 are disposed on the inner surface of the motor case 60 with a gap therebetween and are not fixed to the motor case 60. However, the non-fixed end of the electric motor 5 is elastically supported by the holder 71 being in contact with the motor case 60 via the O-ring 38. Thus, even if the runout occurs at the non-fixed end of the electric motor 5, the runout is absorbed by the O-ring 38 and is suppressed, thereby preventing the holder 71 from colliding with the inner surface of the motor case 60. Alternatively, even if the holder 71 collides with the inner surface of the motor case 60, an impact of the collision can be suppressed. This can reduce the load at the welded part between the motor terminals 5d and the bus bars 70 due to the collision, and avoid damage to the welded part.

In the present embodiment, the O-ring 38 is compressed in the axial direction of the electric motor 5 and held, and thus an axial elastic repulsive force of the O-ring 38 can suppress the runout of the electric motor 5 in the axial direction (axial component of the runout). The runout suppressed by the O-ring 38 is not limited to the runout in the axial direction of the electric motor 5, but can also suppress the runout in any other direction. That is, a frictional force of the O-ring 38 generated between the holder 71 and the cap 62 and an elastic force acting in various directions of the O-ring 38 can suppress the runout in any direction intersecting the axial direction of the electric motor 5.

As described above, in the present embodiment, the runout at the non-fixed end side of the electric motor 5 can be highly effectively suppressed. Thus, the motor terminals 5d and the bus bars 70 can be favorably kept connected even in a severe vibration environment, and a highly reliable electric actuator can be provided.

Further, as in the present embodiment, the O-ring 38, which is interposed between the cap 62 and the holder 71 in the axial direction of the electric motor 5, can eliminate a backlash between the engaging parts 62b of the cap 62 and the engaged parts 61b of body 61 in the axial direction. That is, the O-ring 38 generates the above axial elastic repulsive force, which urges the engaging parts 62b in the direction of the engagement with the engaged parts 61b. Thus, the engaging parts 62b are securely engaged with the engaged parts 61b. This improves assembling efficiency of the cap 62 with respect to the body 61.

In the present embodiment, the O-ring 38 is adopted as the second elastic member, and attached to the outer periphery of the cylindrical part 71a to facilitate the attachment of the second elastic member. However, the second elastic member is not limited to the O-ring. Another elastic member capable of suppressing the runout of the electric motor can be adopted. The bus bars 70 can be configured not to be held by the holder 71 (not to include the holder 71). In that case, the bus bars 70 may directly contact the second elastic member and interpose the elastic member between the case and the bus bars 70.

Although the embodiments of the electric actuator of the present invention have been described above, the present invention is not limited to the above embodiments, and can be further implemented in various forms without departing from the gist of the present invention.

In the above embodiments, the case of the electric actuator 1 includes the motor case 60 including the body 61 and the cap 62, the gear case 10, the screw shaft case 20, and the boot cover 25. However, the structure of the case is not limited to that of the above embodiments. The shape and split structure of the case can be appropriately changed in accordance with a specification change of the internal structure or the assembling efficiency of the electric actuator.

REFERENCE SIGNS LIST 1 electric actuator
3 driving force transmission mechanism
4 motion conversion mechanism
5 electric motor
38 o-ring (second elastic member)
50 o-ring (first elastic member)
60 motor case
61 body (first case split body)
61c position restrictor
62 cap (second case split body)
62d end surface
70 bus bar
71 holder
71a cylindrical part

The invention claimed is:
1. An electric actuator comprising:
a case;
an electric motor built in the case;
a motion conversion mechanism configured to convert a rotary motion of the electric motor into a linear motion;
a conductive member;
a holder holding the conductive member;
a first elastic member; and
a second elastic member,
wherein the electric motor is fixed to the case at a first end in an axial direction of the electric motor,
wherein the first elastic member is provided between an outer peripheral surface of the electric motor and an inner peripheral surface of the case at a second end of the electric motor opposite to the first end fixed to the case,
wherein the conductive member is connected to a motor terminal on the second end of the electric motor opposite to the first end fixed to the case,
wherein the second elastic member is provided between the conductive member and the case, and
wherein the second elastic member is interposed and held between the holder and the case.

2. The electric actuator according to claim 1, wherein the first elastic member is interposed and held while compressed in a radial direction by the outer peripheral surface of the electric motor and the inner peripheral surface of the case.

3. The electric actuator according to claim 1, wherein
the case has a first case split body and a second case split body configured to be assembled with each other,
a protruding position restrictor is provided on an inner peripheral surface of at least one of the first case split body or the second case split body, and
the protruding position restrictor and an end surface of another of the first case split body or the second case split body assembled with and other than the at least one of the first case split body or the second case split body are configured to restrict movement of the first elastic member toward both ends along the axial direction with respect to the electric motor.

4. The electric actuator according to claim 1, wherein the first elastic member includes fluororubber.

5. The electric actuator according to claim 1, wherein the second elastic member is interposed and held between the holder and the case in the axial direction of the electric motor.

6. The electric actuator according claim 1, wherein
the second elastic member is an O-ring,
the holder is provided with a cylindrical part, and
the O-ring is attached to an outer periphery of the cylindrical part.

7. The electric actuator according to claim 1, wherein
the case has a first case split body and a second case split body configured to be engaged with each other and assembled,
the second elastic member is interposed and held between the holder and the second case split body assembled with the first case split body, and
the second case split body is configured to be urged in a direction in which the second case split body is engaged with the first case split body due to an elastic repulsive force of the second elastic member interposed and held between the second case split body and the holder.

* * * * *